(12) United States Patent
Lurtz

(10) Patent No.: US 6,724,195 B2
(45) Date of Patent: Apr. 20, 2004

(54) CONTACT SENSOR

(75) Inventor: Jerome R. Lurtz, 895 W. Romeo Rd., Oakland, MI (US) 48363

(73) Assignee: Jerome R. Lurtz, Oakland, MI (US)

( * ) Notice: Subject to any disclaimer, the term of this patent is extended or adjusted under 35 U.S.C. 154(b) by 0 days.

(21) Appl. No.: 10/306,498

(22) Filed: Nov. 27, 2002

(65) Prior Publication Data

US 2003/0184310 A1 Oct. 2, 2003

Related U.S. Application Data

(63) Continuation-in-part of application No. 10/113,301, filed on Mar. 29, 2002.
(60) Provisional application No. 60/404,019, filed on Sep. 23, 2002.

(51) Int. Cl.$^7$ .............................. G01R 31/08; H01H 3/14
(52) U.S. Cl. ...................................... 324/525; 200/85 R
(58) Field of Search .......................... 324/525, 92, 106; 200/85 R, 86 R; 374/51, 56; 73/818, 763, 710

(56) References Cited

U.S. PATENT DOCUMENTS

| | | | | |
|---|---|---|---|---|
| 3,321,592 A | * | 5/1967 | Miller | 200/86 R |
| 3,748,373 A | * | 7/1973 | Remy | 200/85 R |
| 3,794,790 A | * | 2/1974 | Leyland | 200/86 R |
| 4,060,705 A | * | 11/1977 | Peachey | 200/85 R |
| 4,172,216 A | | 10/1979 | O'Shea | |
| 4,258,100 A | * | 3/1981 | Fujitani et al. | 428/316.6 |
| 4,762,970 A | * | 8/1988 | Brinsley | 200/86 R |
| 4,951,985 A | | 8/1990 | Pong et al. | |
| 5,060,527 A | | 10/1991 | Burgess | |
| 5,441,301 A | * | 8/1995 | Breed et al. | 200/86 R |

OTHER PUBLICATIONS

International Search Report, PCT/US03/09382 dated Sep. 18, 2003.

* cited by examiner

*Primary Examiner*—N. Le
*Assistant Examiner*—Timothy J. Dole
(74) *Attorney, Agent, or Firm*—Dobrusin & Thennisch PC

(57) ABSTRACT

The present invention relates to a contact sensor that detects contact between two objects and includes a first conductor separated from a second conductor by a crushable layer with a predetermined crush resistance. The crushable layer deforms under pressure such that a signal passes between the first and second conductor. Methods of detecting contact are also part of this invention

18 Claims, 5 Drawing Sheets ic application No. 60/404,019, filed Sep. 23, 2002 and is a continuation-in-part of U.S. application Ser. No. 10/113,301 filed on Mar. 29, 2002.

FIELD OF THE INVENTION

This invention relates to a sensor for measuring changes in ambient conditions as well as detecting contact between two objects.

BACKGROUND OF THE INVENTION

Sensors are used to measure a variety of different physical properties, of which temperature and pressure are probably the most relevant to everyday life. Temperature sensors are used in a wide variety of-applications, including, inter alia, sensing the temperature of a fluid in a system, sensing the temperature of industrial processes, and sensing the temperature of electronic components to prevent overheating.

Pressure sensors are also used in a wide variety of applications including, inter alia, sensing the weight of an object, sensing the strength of an impact between two objects and sensing the pressure exerted by a fluid in a system. For example, a pressure sensor is utilized in all scales, which measure weight. Furthermore, scale-type pressure sensors can be used to detect the presence or absence of an object on the scale. For example, it would be advantageous to be able to detect the presence or absence of a person occupying the passenger seat in an automobile. This information could be used in a crash to determine which air bags to deploy and with how much force to deploy the air bags.

Pressure sensors are also an important part of testing the strength of objects. For example, consumer products under go significant testing to make sure that they can withstand the types of forces normally associated with their use.

Furthermore pressure sensors are used to sense the presence of fluids, either liquids or gases, in a system. For example, automobiles use a variety of fluids that allow the vehicle to operate such as motor oil, transmission fluid, antifreeze, and the like. The pressure of these fluids must be monitored to insure that sufficient fluids are present, while also insuring that damage to the vehicle is not caused by over pressurization of the fluid system. Another example of fluid pressure in an automobile that must be by monitored is air pressure in tires. Incorrect tire pressure can lead to tires that prematurely wear out and/or crashes from severely over or under inflated tires.

A subset of pressure sensors are those that detect contact between two objects.

Known temperature and pressure sensors have become unsatisfactory because of the manufacturing processes are complex and therefore expensive. Known sensors may include several moving parts, which need to be assembled. For many sensors, assembly of the moving parts requires precision because of their small size. The required high precision can also lead to high failure rates of the production process, leading to significant costs associated with wasted components. In addition, gas and liquid tight hermetically sealed sensors are particularly difficult and expensive to manufacture. Many failures of sensors and switching devices are do to excessive moisture and/or condensation. Sensors that are rugged, able to withstand high gravitationally forces and/or shock and hermetically sealed are extremely difficult to manufacture.

Accordingly, the inventor has recognized the need for a new type of sensor, which may be inexpensively and reliably manufactured.

SUMMARY OF THE INVENTION

A first aspect of the present invention relates to a temperature and/or pressure sensor that includes a first conductor connected to a source terminal and a second conductor connected to a return terminal. Between the two conductors resides a semi-conductive layer with a predetermined resistance. A resistance measurement device determines how the predetermined resistance of the semi-conductive layer changes in response to a change in pressure or temperature. Also included is a sensor with integral fault detection. The present invention also relates more generally to a coaxial cable, which includes a semi-conductive layer between two conductors. The present invention also incorporates a method of sensing pressure or temperature by measuring a change in resistance of a semi-conductive layer.

A second aspect of the present invention also relates to a contact sensor that detects contact between two objects. In this aspect of the invention, the first conductor is separated from the second conductor by a crushable layer with a predetermined crush resistance. The crushable layer deforms under pressure such that a signal passes between the first and second conductor.

DETAILED DESCRIPTION

Figure 1:
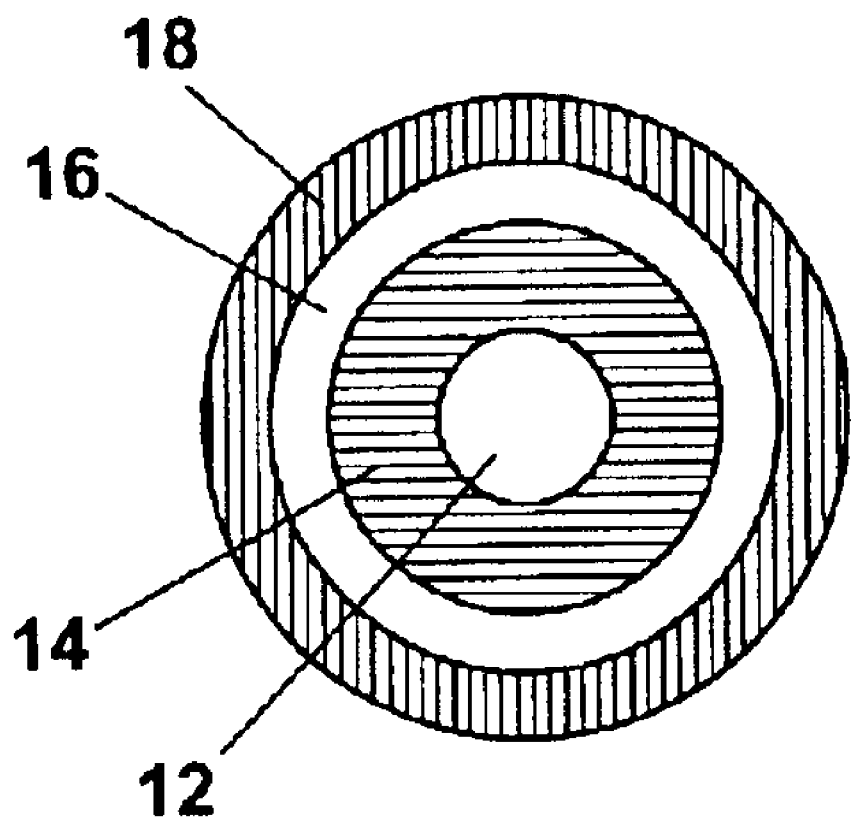
FIG. 1 depicts a cross section of the coaxial embodiment of the pressure and temperature sensor of the present invention.

As seen in cross-section in FIG. 1, the sensor 10 of the first aspect of the present invention includes a first conductor 12 surrounded by a semi-conductive layer 14 which in turn is surrounded by a second conductor 16. Second conductor 16 may be surrounded by a protective jacket 18. This configuration is commonly called a coaxial cable because the two conductors have congruent axes running along the main axis of the cable. In another embodiment, the first conductor is separated from the second conductor by a semi-conductive layer such that the inner conductor is not surrounded by the semi-conductive layer, nor is the semi-conductive layer surrounded by the second conductor. For example, conductors and a semi-conductive layer in the form of sheets may be utilized. Alternately, the conductors and the semi-conductive layer may be placed on to a substrate or a surface such as a printed circuit board.

The semi-conductive layer may include any material, which acts like a partial conductor or a resistor. While organic semi-conductive materials are preferred, inorganic materials are also suitable. In one embodiment, the semi-conductive layer includes a base material doped with a filler. The base material is selected from all materials, which may be suitable for use in an extrusion process. For example, flexible thermoplastics are suitable because their characteristic is generally well understood. Exemplary thermoplastics include polyolefins, such as polyethylenes and polypropylenes, styrenes, polyvinylchlorides, polyamides, polyesters, polyimides and fluoropolymers. Such base materials are generally inexpensive because they are not required to have insulating properties. Furthermore, these thermoplastics are typically easy to work. In other embodiments, the semi-conductive layer may be a neat thermoplastic, or a thermosetting resin or a silicone, either of which may be doped or used neat.

The filler may be any material which affects, i.e., increase or decreases, the resistance of the base material through its addition to the base material. Fillers are selected for compatibility with manufacturing apparatus and processes and preferably for extrusion apparatus and processes. Typically, the filler is a powder or particulate material, which is blended with the base material, although liquids may also be used. The filler may be resistive, conductive or semi-conductive. The filler may be a single material or multiple materials selected to achieve the desired resistive properties. An exemplary conductive filler is carbon, such as carbon black or lamp black, while metals, such as gold and silver, may also be used as conductive fillers.

The amount of filler is typically between 0.01 and 75 wt % of the semi-conductive layer, however, any percentage can be used to achieve the desired resistance of the semi-conductive layer. Preferably, the semi-conductive layer has 10–65 wt % of filler. Most preferably, the filler is 30 wt % of the semi-conductive layer.

The first and second conductors are preferably made of copper, but other metals and alloys known in the art may be used, with the only requirement being that the first and second conductors conduct electricity. In the coaxial embodiment, the inner conductor may be a single wire, but multiple wire braids of annealed copper are preferred. The outer conductor may be in any form that is convenient, such as a wrapping or a woven sheath. In one preferred embodiment, the outer conductor includes a wrapping of 25 wires of annealed copper.

The protective jacket may be made of any material that serves to protect the sensor from abrasion and cut through. Preferred materials are those which can be extruded or otherwise coated on to a cable. Exemplary protective jackets include those made from thermoplastics such as polyolefins, such as polyethylenes and polypropylenes, styrenes, polyvinylchlorides, polyamides, polyesters, polyimides and fluoropolymers. The protective jacket may also be made from thermosetting materials or silicones. The material of the protective jacket may be doped or used neat. The materials of protective jacket may also be selected to provide crush resistance or thermal insulation properties.

In one embodiment, the sensor responds primarily to changes in pressure, while being relatively insensitive to changes in temperature. In a second embodiment, the sensor responds primarily to changes in temperature, while being relatively insensitive to changes in pressure. A third embodiment of the sensor is sensitive to both temperature and pressure changes. Appropriate selection of materials for the semi-conductive material, as well as the protective jacket may be used to determine to which of temperature or pressure the sensor is sensitive. Sensors which are even minimally sensitive to pressure are hereafter referred to as pressure sensitive embodiments, while sensors which are even minimally sensitive to temperature are hereafter referred to as temperature sensitive embodiments.

The semi-conductive layer has a resistance, which fluctuates in response to the ambient condition being sensed. That is, the amount of pressure applied to the semi-conductive layer and/or the temperature of the semi-conductive layer changes the resistance of the semi-conductive layer. The predetermined or base resistance of the semi-conductive layer is related to the type of base material, the type of filler, the amount of filler and the volume of the semi-conductive layer.

When a conductive filler is used, then the resistance of the semi-conductive layer will decrease as the pressure increases. Conversely, if a resistive filler is used, then the resistance of the semi-conductive layer will increase as the pressure increases. In general, no matter which kind of filler is used, as temperature increases, so does the resistance.

Furthermore, the sensitivity of the semi-conductive layer to pressure is proportional to the amount filler contained within the base material. For a conductive filler, a semi-conductive layer with a higher amount of filler will be more sensitive to pressure than a semi-conductive layer with a lower amount of filler. Resistive fillers produce semi-conductive layers with similar attributes, i.e., as the amount of resistive filler increases, so does the sensitivity of the semi-conductive layer to pressure. In general, in a pressure sensor, as temperature decreases, so does sensitivity.

In pressure sensitive embodiments, the protective jacket cannot be so stiff as be impervious to the pressure of the medium in which the sensor is placed. However, in an alternate embodiment, the sensor may be partially covered by a second protective jacket, which is impervious to the pressure of the medium.

Likewise, in temperature sensitive embodiments, the protective jacket cannot be so insulating as to completely shield the semi-conductive layer from the temperature of the medium in which the sensor is placed. Like the pressure sensitive embodiment, the sensor may be partially covered by a second protective jacket, which insulates the semi-conductive layer from the temperature of the medium.

In one pressure sensitive embodiment, the sensor or the responsive portion of the sensor is attached to a substrate such that the sensor or responsive portion is pressed by the medium against the substrate in order to register pressure or changes in pressure. In another pressure sensitive embodiment, the sensor or responsive portion forms an arc that is flexed by the medium to register pressure or changes in pressure without the need for the sensor to be attached to a substrate. Other shapes besides arcs may also be suitable such as S-shaped, spirals or helixes.

In the temperature sensitive embodiments, the responsive portion of the sensor need not be attached to a substrate or assume any particular shape.

The temperature/pressure sensor of the present invention is advantageously manufactured using any construction technique, which results in a sensor of the desired shape and size. Flat sensors may be manufactured via layering process such as polymer thick film or lithography, while coaxial cable sensor may be made using extrusion techniques. For example, a coaxial sensor may be made by extruding or otherwise coating the semi-conductive layer onto the first conductor and then weaving or wrapping the second conductor on to the semi-conductive layer. Finally, the protective jacket is extruded, or otherwise coated, onto the second conductor.

Figure 2:
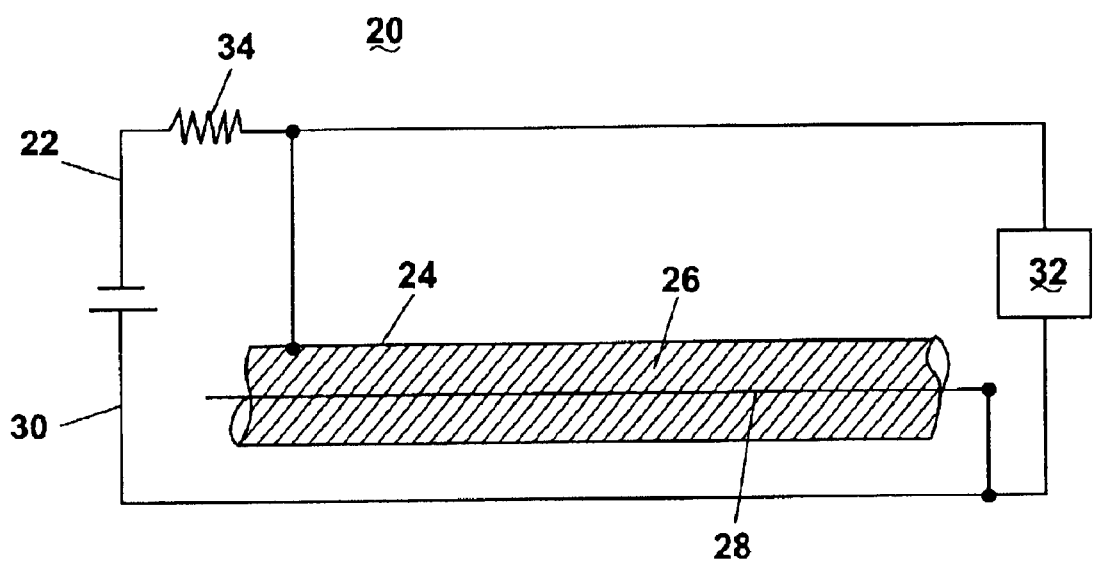
FIG. 2 depicts a circuit diagram of one embodiment of the present invention.

As depicted in FIG. 2, the sensor 20 of the first aspect of the present invention operates as an electrical circuit, i.e., electricity from a source terminal 22 is passed to the first conductor 24 and then through the semi-conductive layer 26 to the second conductor 28, which in turn passes the electricity to a return terminal 30. In the coaxial embodiment, the first conductor may be the inner or the outer conductor.

In addition, the electrical circuit includes a resistance measurement device 32 to measure the resistance of semi-conductive layer or to monitor fluctuations in the resistance of the semi-conductive layer. Starting with a predetermined resistance, changes in that resistance indicate changes in temperature and/or pressure. Generally, resistance measurement devices take the form of measuring the voltage or current across the semi-conductive layer. Such resistance measurement devices are well known to those skilled in the art and may include, inter alia, a voltage divider, a voltage meter, or an amp meter. Furthermore, one or more additional constant resistors 34 may be utilized in combination with or as part of the resistance measurement device.

One advantage of a sensor according to the first aspect of the present invention is that fault detection is built into the sensor. If the resistance of the semi-conductive layer goes to infinity (or the conductance goes to zero), then it is clear that the electrical circuit has been broken and the sensor is no longer capable of sensing pressure or temperature. Several situations may lead to this condition, such as the sensor has reached the upper limit of the range of pressure or temperature which can be sensed by that particular sensor, the semi-conductive layer has degraded to point that it can no longer carry electricity, or the semi-conductive layer has been partially or fully cut through.

Figure 3:
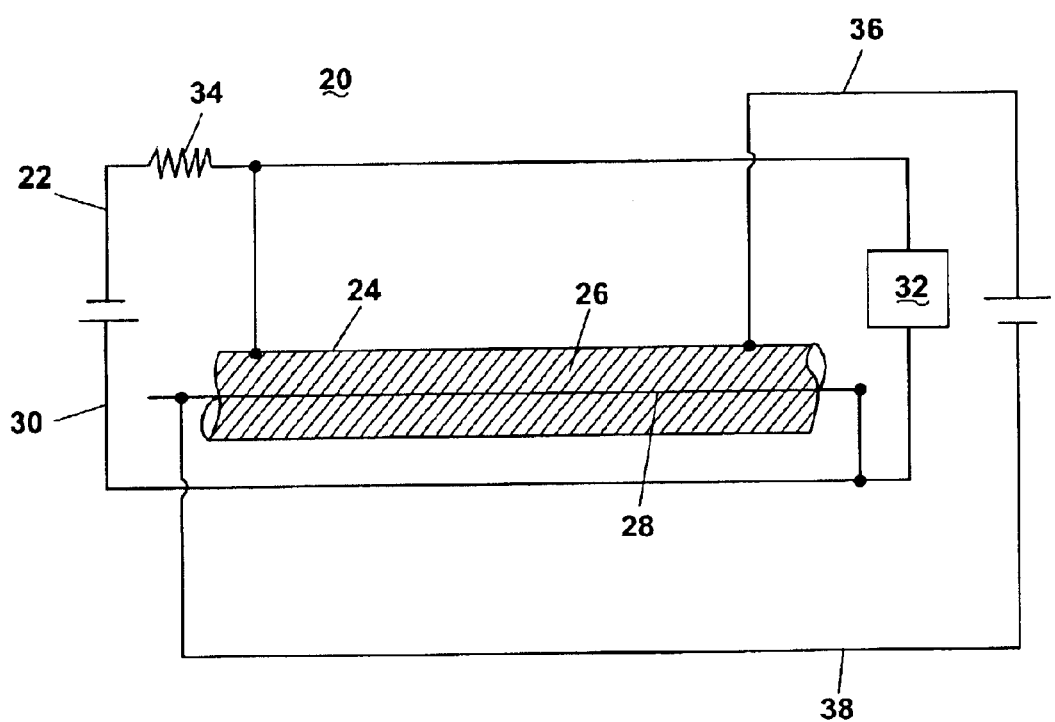
FIG. 3 depicts a circuit diagram of another embodiment of the present invention.

In another embodiment of the first aspect of the present invention, shown in FIG. 3, additional components may be included to provide a fault detection device for the conductors within the sensor. In one useful fault detection device, the first conductor 24 is connected to a source terminal 22 and a return terminal 36, while the second conductor 28 is connected to a source terminal 38 and a return terminal 30. As discussed above, to sense pressure or temperature, a resistance measurement device 32 may be used to measure the current or voltage, or change thereof, between source terminal 22 and return terminal 30.

Fault detection in the first conductor is accomplished by monitoring current or voltage between source terminal 22 and return terminal 36, while fault detection in the second conductor is accomplished by monitoring current or voltage between source terminal 38 and return terminal 30. Like the semi-conductive layer, if the resistance of the conductors goes to infinity (or the conductance goes to zero) between terminals 22 and 36 or 38 and 30, then it is clear that there is a fault in the first or second conductor, respectively. A resistance measurement device may be used to monitor current or voltage in the first and/or second conductor.

Source terminals 22 and 38 may be the same terminal or different terminals, as may return terminals 36 and 30. A timing device and a variety of switches may be utilized to coordinate the routing of electricity to the proper components of the sensor depending on which function or component is being monitored. For example, timed switches may cycle electricity from across the semi-conductive layer to across the first conductor to across the second conductor. A cycle of this type would first sense pressure and/or temperature while checking the integrity of the semi-conductive layer, then detect faults in the first then the second conductor. Furthermore, computer hardware and software may be utilized to implement the fault detection in the sensor, whether for the semi-conductive layer or for the conductors.

Figure 5:
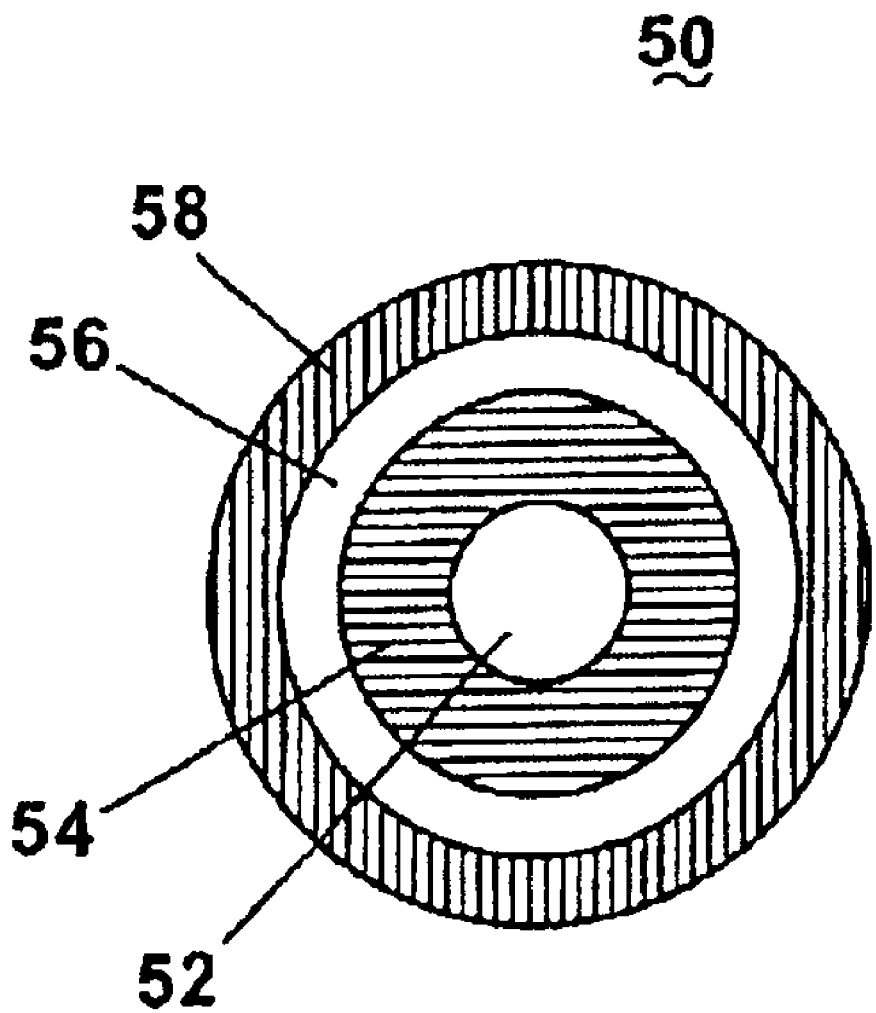
FIG. 5 depicts a cross-section of the coaxial embodiment of the contact sensor of the present invention.

As seen in cross-section in FIG. 5, the contact sensor 50 of the second aspect of the present invention includes a first conductor 52 surrounded by a crushable layer 54 which in turn is surrounded by a second conductor 56. Second conductor 56 may be surrounded by a protective jacket 58. Like the pressure/temperature sensor, the contact sensor is preferably coaxial, although flat sensors may be useful. Also, the contact sensor may be attached to an substrate or object.

The crushable layer may include any structure or material that physically separates one conductor from the other, while also insulating the conductors from each other. In addition to support and insulation, the crushable layer should deform under pressure, such that at a predetermined amount of deformation, a signal passes between the two conductors. For example, an electrical circuit is completed when the two conductors touch. In the alternative, the signal need not be electrical and the conductor need not touch. Indeed, the material of the crushable layer may be such that its insulating properties change as it deforms.

In one embodiment, the crushable layer includes a plurality of struts that hold the conductors apart in the absence of any pressure. Application of pressure causes the struts to deform sufficiently to pass a signal between the conductors. In the coaxial embodiment, the struts may radiate from the inner conductor to support the outer conductor. The air contained in the spaces between the struts acts as insulation. In another embodiment, shown in FIG. 5, the crushable layer includes a foamed material that separates the two conductors and provides insulation. Application of pressure causes the foam to deform sufficiently to pass a signal between the conductors. One foam useful as a crushable layer is a thermoplastic foam such as low density polyethylene. The foam may be made up of between 10–90% by volume of void spaces, foams with 30–70% volume of void spaces preferred. Other materials and structures that meet the above listed criteria are also suitable for use as crushable layer.

Conductors and protective jackets useful for the temperature/pressure sensor may also be useful for the contact sensor. In one embodiment, an unfoamed form of the crushable layer material may be used for the protective jacket, e.g. low density polyethylene.

In operation, one conductor is connected to a signal generator and the other conductor is connected to a signal detector. In the absence of pressure, the crushable layer insulates the two conductors from each other so that no signal passes from one conductor to the other. When pressure is applied on the sensor by sandwiching the sensor between two objects, the crushable layer deforms to allow a signal to pass between the conductors. The deformation of the crushable layer allows the generated signal to pass from one conductor to the other and onward to the signal detector. In this way, the sensor detects the contact between two objects.

Any signal that can pass between conductors is suitable. Preferably, the signal is a DC current, however, an AC current may be used as well as a RF signal. A voltage may also be used as a signal. In addition, light may also be used as a signal between the conductors. The insulating properties of the crushable layer will be selected based on the type of signal utilized. Further, appropriate signal generators and detectors will also be selected based on the type of signal to be passed between the conductors.

The sensitivity of the contact sensor depends on the thickness of the crushable layer as well as the stiffness of the crushable layer. The thicker the layer, the more it has to deform before a signal can pass between the two conductors.

Likewise, the stiffer the crushable layer, the more pressure needed to deform it sufficiently to allow a signal to pass between the two conductors.

Like the temperature/pressure sensor, the contact sensor may also utilize a fault detection device, as shown in FIG. 3. Specifically, current or voltage may be used to determine when either the first or second conductor has lost its physical integrity. Additional fault detection procedures can be implemented by detecting a signal when the sensor is known to be inactivated or when the sensor is known not to be not sensing contact.

The sensor of the present invention is advantageously manufactured using any construction technique which results in a sensor of the desired shape and size. Flat sensors may be manufactured via layering process such as polymer thick film or lithography, while coaxial sensors may be made using extrusion techniques. For example, a coaxial sensor may be made by extruding or otherwise coating the crushable layer onto the first conductor and then weaving or wrapping the second conductor on to the crushable layer. Finally, the protective jacket may be extruded, or otherwise coated, onto the second conductor.

The sensor of the present invention is relatively inexpensive to manufacture because known techniques are used. In addition, the sensor may be effectively and inexpensively hermetically sealed during manufacture or installation through the application of a sealant to edges or ends of the sensor. For example, a coaxial sensor can be manufactured and then stored on large spools. At the time of installation, the sensor may be cut to length and the ends sealed once it has been connected to the signal generator and detector. Useful sealants may include any material that can form a gas/liquid tight seal. In one useful embodiment, an air polymerization silicone may be used. Any type of liquid material that creates a seal when it cures may also be used, such as, hot liquid polyethylene. In addition, special pre-formed gas/liquid tight connectors can be applied directly to the coaxial contact sensor.

On exemplary use of the contact sensor of the present invention is to sense door position on an automobile. A protrusion on the door or vehicle frame presses on the sensor when the door is in the proper position (open or closed), deforming the crushable layer. Upon sufficient deformation a signal passes between the conductors and is detected by the signal detector. After contact detection the signal detector then forward the information to another device that takes action based on the information. For example, the device may provide an visual or audible indication that contact between the door and the vehicle frame has been made.

EXAMPLE

A coaxial sensor capable of sensing pressure was constructed using a first conductor of bare annealed copper with 7×0.10 mm strands with a total outer diameter (OD) of 0.30 mm. The semi-conductive layer comprised low density polyethylene (LDPE) doped with 30 wt % lampblack (HI-BLACK 40B2 from Korea Carbon Black) and was applied to create a cable with an OD of 0.7 mm. The second conductor was a bare annealed copper spiral shielding with 25×0.10 mm such that the cable had an OD of 0.9 mm. Finally, a protective jacket of LDPE was applied to create a cable with an OD of 1.5 mm.

Figure 4:
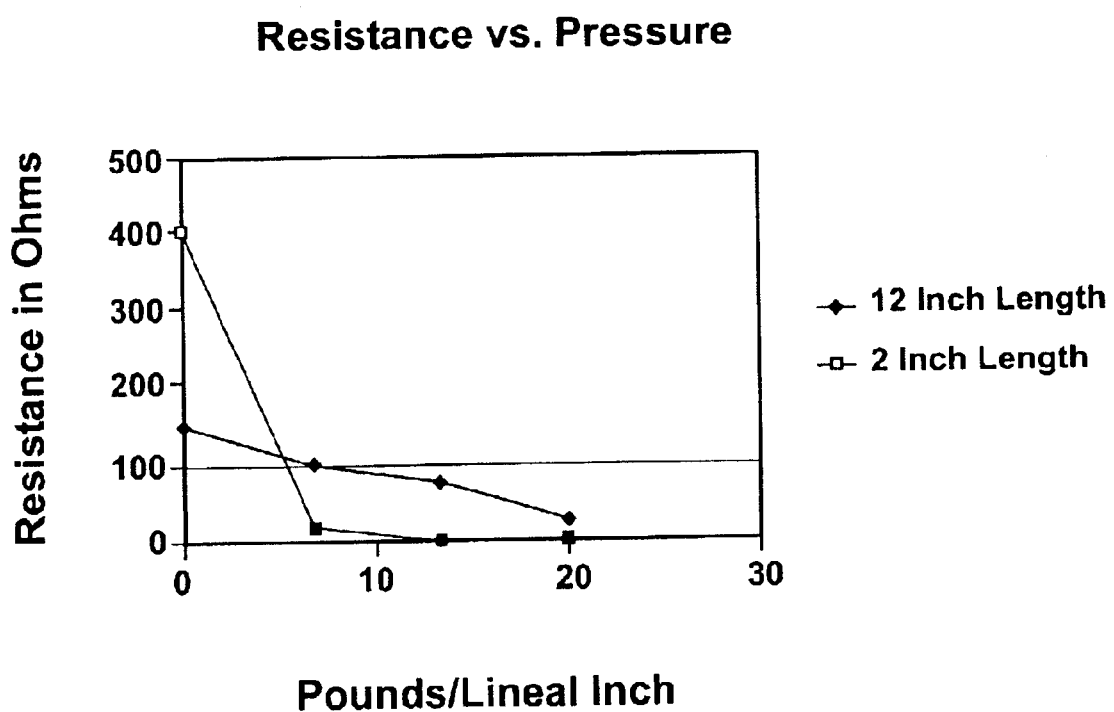
FIG. 4 depicts a resistance versus pressure chart for a pressure sensor according to the present invention.

Coaxial cable constructed as described above, was subjected to testing to determine how the resistance of the cable changed with regard to increases in pressure. As seen in FIG. 4, the coaxial cable has a predetermined resistance, i.e., at zero pressure, of about 400 ohms in a 2-inch length and 150 ohms in 12-inch length. As pressure is applied, measured in lbs/lineal inch, the resistance decreases. As can be seen, the pressure does affect the resistance of the semi-conductive layer in a way that allows pressure to be measured.

While the invention has been specifically described in connection with certain specific embodiments thereof, it is to be understood that this is by way of illustration and not of limitation, and the scope of the appended claims should be construed as broadly as the prior art will permit.

What is claimed is:

1. A sensor comprising:
    a cable comprising:
        a first conductor, a second conductor, and an extruded crushable layer located between the first and second conductors;
    a signal generator connected to the first conductor; and
    a signal detector connected to the second conductor,
    wherein the first and second conductors are adapted to touch and pass a signal from the signal generator to the signal detector upon deformation of the crushable layer.

2. The sensor of claim 1, wherein the first and second conductors are coaxial.

3. The sensor of claim 1, further comprising a protective layer.

4. The sensor of claim 1, wherein the crushable layer includes a foam.

5. The sensor of claim 1 further comprises a fault detection device.

6. The sensor of claim 1, wherein the cable is hermetically sealed.

7. A device comprising:
    a cable comprising a first conductor; a second conductor; and an extruded crushable layer located between said first and second conductors, wherein the first and second conductors are coaxial and the crushable layer is adapted to permit the first and second conductors to touch and to pass a signal upon the deformation of the crushable layer.

8. The device of claim 7, further comprising a protective layer.

9. The device of claim 7, wherein the crushable layer includes a foam.

10. The device of claim 7 further comprises a fault detection device.

11. The device of claim 7, wherein the cable is hermetically sealed.

12. A method of sensing contact between two objects, comprising:
    generating a signal on a first conductor;
    deforming an extruded crushable layer separating the first conductor from a second conductor; and
    detecting the signal on the second conductor when the conductors touch.

13. The method of claim 12, wherein the first conductor is coaxial with the second conductor.

14. The method of claim 13, wherein the crushable layer includes a thermoplastic.

15. The method of claim 14, wherein the crushable layer includes a foam.

16. A method of manufacturing a sensor, comprising:
    extruding a crushable material onto a first conductor; and
    covering the extruded crushable material with a second conductor,
    wherein the crushable material is adapted to permit the first and second conductors to touch.

17. The method of claim 16 further comprising covering the second conductor with a protective covering.

18. The method of claim 16 further comprising connecting one of the first and second conductors to a signal generator and connecting the remaining conductor to a signal detector.

* * * * *